US010631671B2

(12) United States Patent
Mohr

(10) Patent No.: US 10,631,671 B2
(45) Date of Patent: Apr. 28, 2020

(54) WALL-MOUNTABLE VANITY MIRROR WITH INSET MAGNIFYING MIRROR

(71) Applicant: William Douglass Mohr, Canton, GA (US)

(72) Inventor: William Douglass Mohr, Canton, GA (US)

(*) Notice: Subject to any disclaimer, the term of this patent is extended or adjusted under 35 U.S.C. 154(b) by 53 days.

(21) Appl. No.: 15/726,991

(22) Filed: Oct. 6, 2017

(65) Prior Publication Data

US 2019/0104869 A1  Apr. 11, 2019

(51) Int. Cl.
| | |
|---|---|
| *A47G 1/16* | (2006.01) |
| *G02B 7/198* | (2006.01) |
| *G02B 7/182* | (2006.01) |
| *A47G 1/24* | (2006.01) |
| *A45D 42/08* | (2006.01) |
| *A47G 1/04* | (2006.01) |

(52) U.S. Cl.
CPC .......... *A47G 1/1613* (2013.01); *A45D 42/08* (2013.01); *A47G 1/04* (2013.01); *A47G 1/24* (2013.01); *G02B 7/1824* (2013.01); *G02B 7/198* (2013.01)

(58) Field of Classification Search
CPC .......... A47G 1/1613; A47G 1/24; A47G 1/02; A47G 1/16; A47G 1/04; A47G 1/164; G02B 7/198; G02B 7/1824; G02B 7/182; G02B 5/08
USPC ................ 359/891, 892, 881, 882
See application file for complete search history.

(56) References Cited

U.S. PATENT DOCUMENTS

| | | | |
|---|---|---|---|
| 2,199,731 A | 5/1940 | Pryne | |
| 3,267,806 A | 8/1966 | Azegami | |
| 3,315,932 A | 4/1967 | Chandler | |
| 3,392,950 A | 7/1968 | Pierce | |
| 3,476,927 A | 11/1969 | Rothman | |
| 4,856,888 A | 8/1989 | Wahl | |
| 5,164,861 A | 11/1992 | Katz | |
| 5,229,888 A | 7/1993 | Gustafsson et al. | |
| 5,399,008 A | 3/1995 | Vann, Jr. | |
| 6,305,809 B1 * | 10/2001 | Zadro | A45D 42/08 248/474 |
| 7,300,169 B1 | 11/2007 | Yue | |
| 7,562,980 B2 * | 7/2009 | Rymniak | A45D 42/16 351/159.01 |
| 8,182,053 B1 | 5/2012 | Schacher et al. | |

(Continued)

FOREIGN PATENT DOCUMENTS

| | | | |
|---|---|---|---|
| CA | 2922596 A1 * | 9/2016 | ............. A45D 42/10 |
| GB | 144539 | 6/1920 | |

*Primary Examiner* — Jade R Chwasz
(74) *Attorney, Agent, or Firm* — Andrew M. Harris; Mitch Harris, Atty at Law

(57) ABSTRACT

A mirror system including a flat non-magnifying mirror and an inset magnifying mirror provides an installation that is aesthetically pleasing and has reduced susceptibility to damage, for installation in locations such as hotel rooms and hotel bathrooms. The magnifying mirror is inset in an aperture defined by the larger non-magnifying mirror and is either fixed in place by bonding to the edges of the aperture or using a backer, or is extendable from an extension arm that is recessed in a box that extends into a wall behind the mirror system when installed. The extension arm may be a swing arm, a telescoping arm or a scissor arm that is fastened to the back or a side of the box.

18 Claims, 8 Drawing Sheets

(56) References Cited

U.S. PATENT DOCUMENTS 8,556,447 B2 10/2013 Griggs
9,211,004 B2 12/2015 Diemel, Jr. et al.

* cited by examiner

WALL-MOUNTABLE VANITY MIRROR WITH INSET MAGNIFYING MIRROR

BACKGROUND OF THE INVENTION

1. Field of the Invention

The present invention relates generally to large vanity mirrors, such as used in hotels, and in particular, to a vanity mirror with an inset magnifying mirror.

2. Description of the Related Art

Magnifying mirrors are frequently provided in hotels and are otherwise in widespread use in conjunction with larger wall-mountable mirrors. The magnifying mirror is typically provided attached to a movable arm mounted to a wall in front of the larger vanity mirror in a hotel that provides for positioning of the magnifying mirror, but can be easily damaged, for example, when weight is applied to the magnifying mirror by children, or used to suspend a relatively heavy object. Other less-costly magnifying mirrors could be applied via an adhesive to the front surface of a larger mirror, in a manner similar to small wide-angle mirrors commonly used for vehicular applications to provide a wide-angle view. However, such mirrors are readily visible as an unaesthetic addition to a hotel mirror.

It would therefore be desirable to provide a wall-mountable magnifying mirror having a pleasing aesthetic and having a reduced susceptibility to damage.

SUMMARY OF THE INVENTION

The objective of providing a wall-mounted magnifying mirror having a pleasing aesthetic and reduced susceptibility to damage is provided in a flat non-magnifying mirror having an inset magnifying mirror.

The non-magnifying mirror is a back-coated sheet of glass forming a non-magnifying mirror, with an aperture formed therethrough. A magnifying mirror having a convex profile at a back-coated surface thereof is either mounted in the aperture, or is extendable from the aperture, so that the front of the mirror systems encompassing both mirrors provides a substantially flat aesthetically-pleasing profile. The magnifying mirror may be mounted via an extension arm to the inside of a recess box mounted to the back surface of the non-magnifying mirror and sized to fit the box in a hole cut between wall studs behind the mirror-mounting location. When the magnifying mirror is retracted from an extended position, the magnifying mirror closes off the box and substantially conforms to the front surface of the non-magnifying mirror. The extension arm may be a swing arm with two or more folding sections, a telescoping arm with two or more telescoping sections, or a scissor arm arrangement with multiple sections.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present disclosure includes vanity mirror systems that include a magnifying mirror and a larger non-magnifying mirror having an aperture formed through from the front to the back. The magnifying mirror is sized to fit within and cover the aperture, providing the aesthetic of a continuous large mirror, while providing magnifying mirror functionality. The magnifying mirror may be mounted within the aperture with adhesive, or by using a backer, or the magnifying mirror may be extended by including a box behind the mirror and an extension arm mounted to the box and coupled to the mirror, so that a user can extend the magnifying mirror temporarily to bring the magnifying mirror closer to their face.

Figure 1:
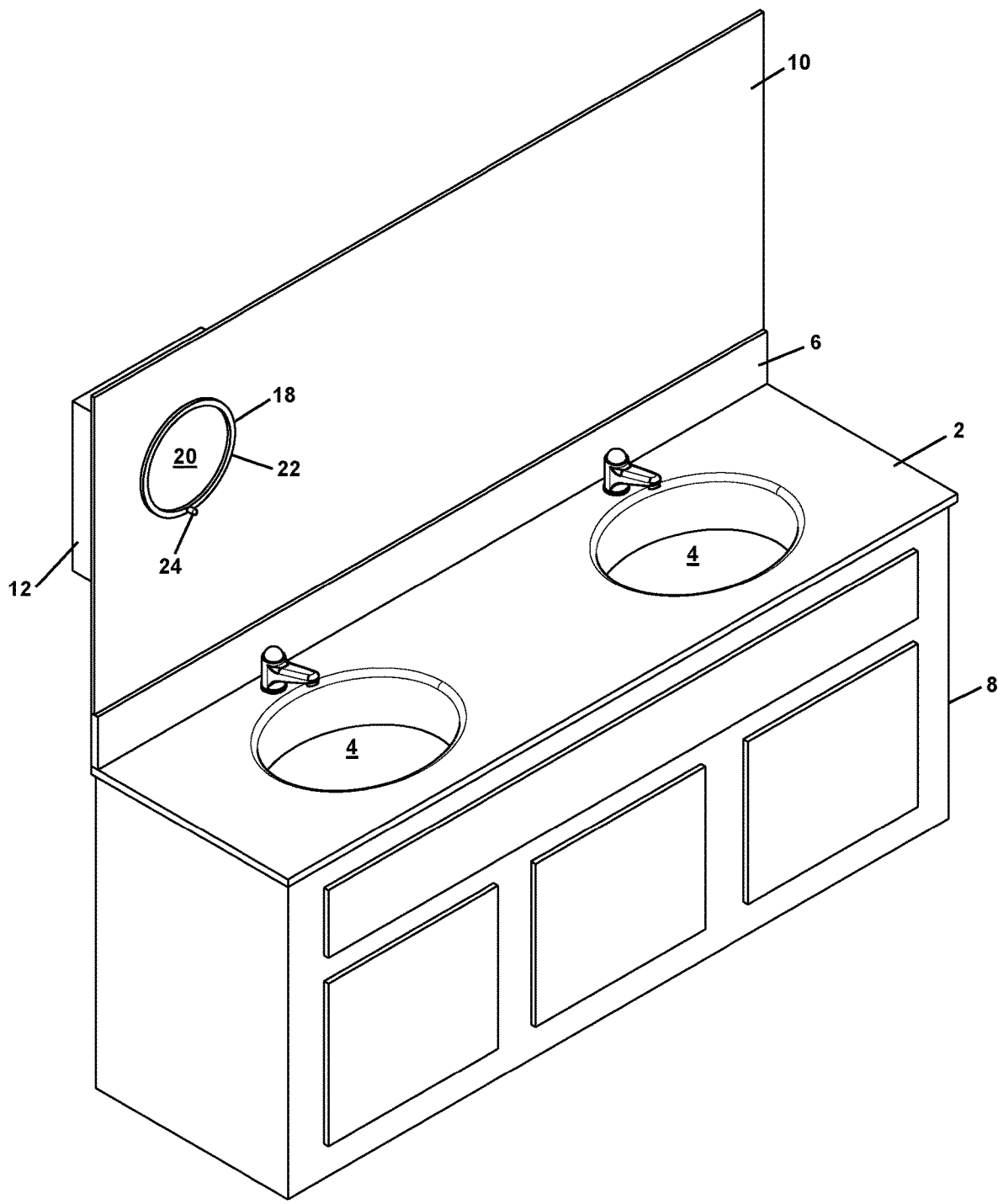
FIG. 1 is a perspective view of a mirror system installation as disclosed herein.

Referring now to FIG. 1, a first example of a vanity mirror system is shown in an installation without wall details. A large non-magnifying mirror 10 is mounted above a backsplash 6 of a two-sink vanity 2 having two sinks 4 and supported by a cabinet base 8. Non-magnifying mirror 10 is a typical back-silvered glass mirror, generally ⅜" in thickness, but having a circular aperture 18 formed through the glass that permits a magnifying mirror 20 to be placed within aperture 18. A recessed box 12 is attached to the back of non-magnifying mirror 10 by adhesive applied between the back of non-magnifying mirror 10 and flanges extending from sides of recessed box 12, but can alternatively form a separate assembly that is pre-assembled to a wall, with non-magnifying mirror 10 installed afterward. Magnifying mirror 20 is surrounded by at a back side and edges by a mirror mount 22, to which a knob 24 is mounted, providing a pull mechanism for extracting magnifying mirror 20 from a position within aperture 18. Knob 24 is omitted for embodiments described below in which magnifying mirror 20 is permanently attached to non-magnifying mirror 10 and therefore cannot be extended. In such embodiments, mirror mount 22 may be replaced by an edge protector that covers only the edges and not the back of magnifying mirror 20. An edge protector may also be provided around the edges of the aperture 18, e.g., a thin and transparent plastic u-shaped gasket, or other suitable protection. Mirror mount 22 may also be of such construction, but in extendable versions of the mirror system as described below, will generally be a metal or metalized frame that encloses the outer edges and back of magnifying mirror 20. In the depicted examples, aperture 18 is circular and magnifying mirror 20 also has a circular profile, which is dimensioned to allow magnifying mirror 20 to be seated within aperture 18 without a substantially visible gap. Other shapes of magnifying mirror 20, such as rectangular, square or oval, and aperture 18 will generally have a shape conforming to the outside edge of magnifying mirror 20. Aperture 18 is sized to accommodate magnifying mirror 20 along with any edge protector(s) and/or mirror mount 22 included between magnifying mirror 20 and non-magnifying mirror 10.

Figure 2A:
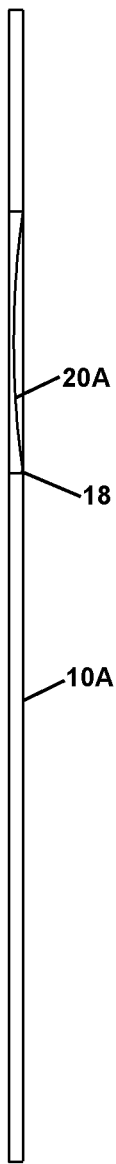
FIGS. 2A-2C are side cross-section views illustrating examples of mirror systems having fixed magnifying mirrors.
Figure 2B:
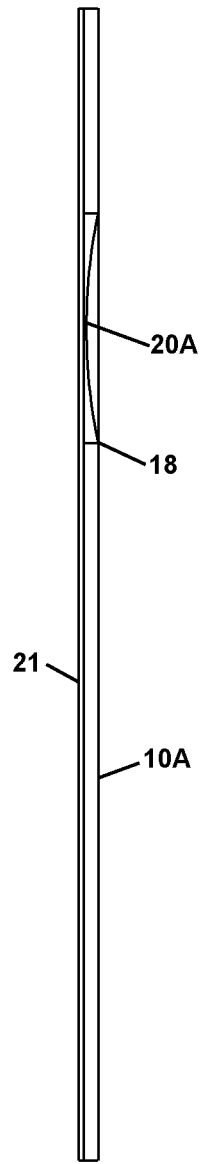
Figure 2C:
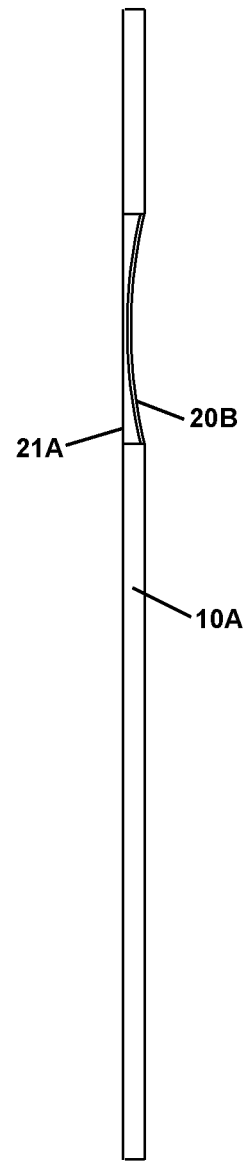

Referring now to FIGS. 2A-2C, other examples of vanity mirror systems are shown. FIGS. 2A-2C illustrate vanity mirror systems in which a magnifying mirror 20A or 20B is stationary within a non-magnifying mirror 10A, i.e., magnifying mirror 20A or 20B is mounted permanently to non-magnifying mirror 10A. FIG. 2A shows a configuration in which a plano-concave magnifying mirror 20A having a front-silvered face is inserted into aperture 18 of non-magnifying mirror 10A and secured with an adhesive applied around the edges of aperture 18 and/or outer edges of magnifying mirror 20A. FIG. 2B illustrates a configuration including a backer 21, which may be made from plastic, paper or other suitable material, and which is bonded to back sides of both non-magnifying mirror 10A and magnifying mirror 20A. FIG. 2C illustrates a curved magnifying mirror 20B having a silvered back, which may be backed up with a backer fill 21A or in which a void is present behind magnifying mirror 20B.

Figure 3:
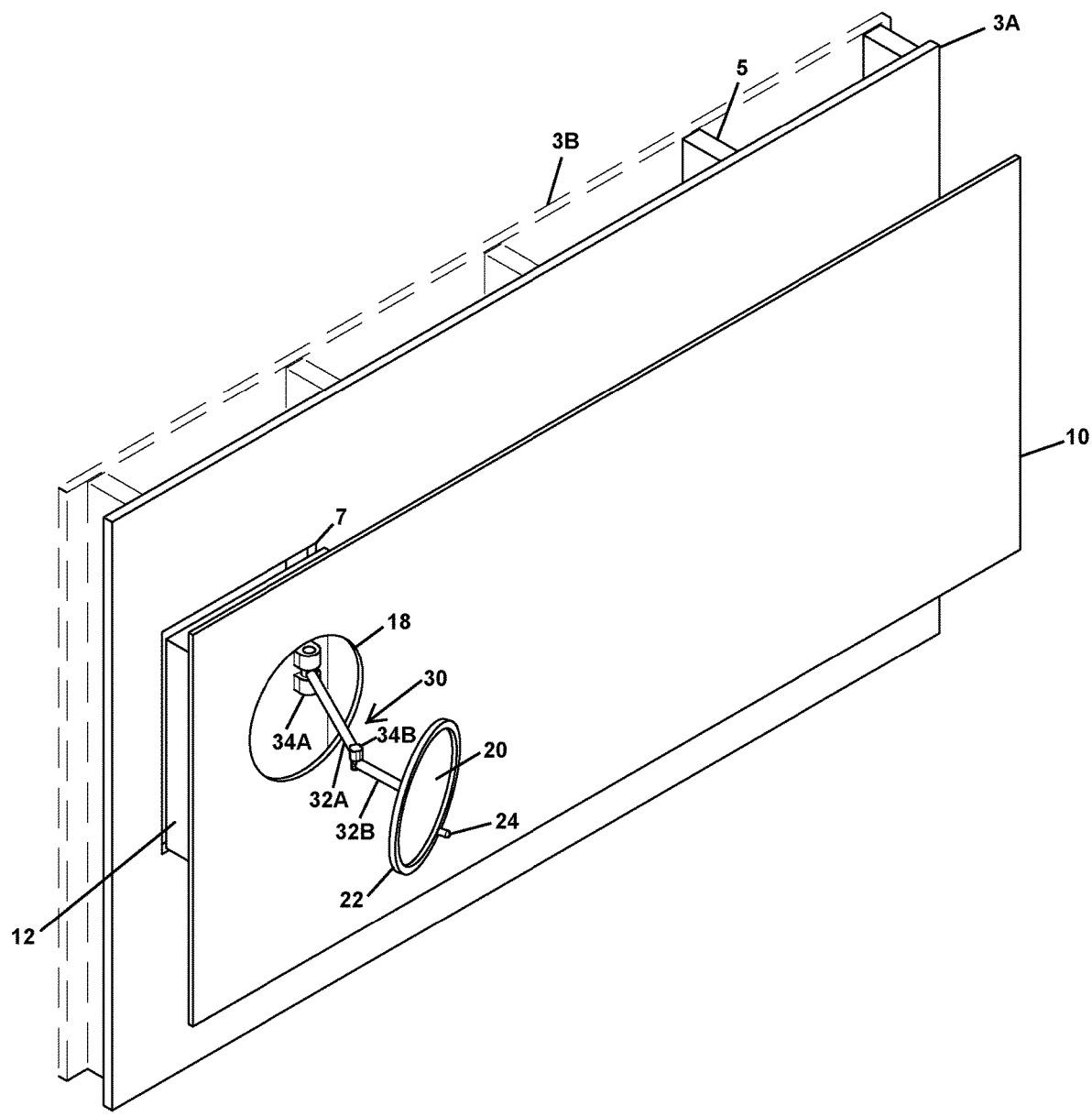
FIG. 3 is a perspective view of an example mirror system being installed.

Referring now to FIG. 3, details of another example of a vanity mirror system is shown, in which an extension arm 30 provides for extending magnifying mirror 20 from the position illustrated in FIG. 1, i.e., the position in which magnifying mirror 20 resides within aperture 18. Extension arm 30 includes two or more arm segments 32A-32B, which collapse to locate a least one of arm segments 32A,32B substantially parallel to the plane of non-magnifying mirror 10 when magnifying mirror 20 is pushed back in to aperture 18. A mounting hinge 34A mounts to the back surface of recessed box 12 and allows arm segment 32A to rotate to a position behind aperture 18. A second hinge 34B connects arm segments 32A and 32B, allowing arm segment 32A to rotate to the substantially parallel configuration within recessed box 12 when magnifying mirror 20 is pushed back into aperture 18 as illustrated in FIG. 4.

Figure 4:
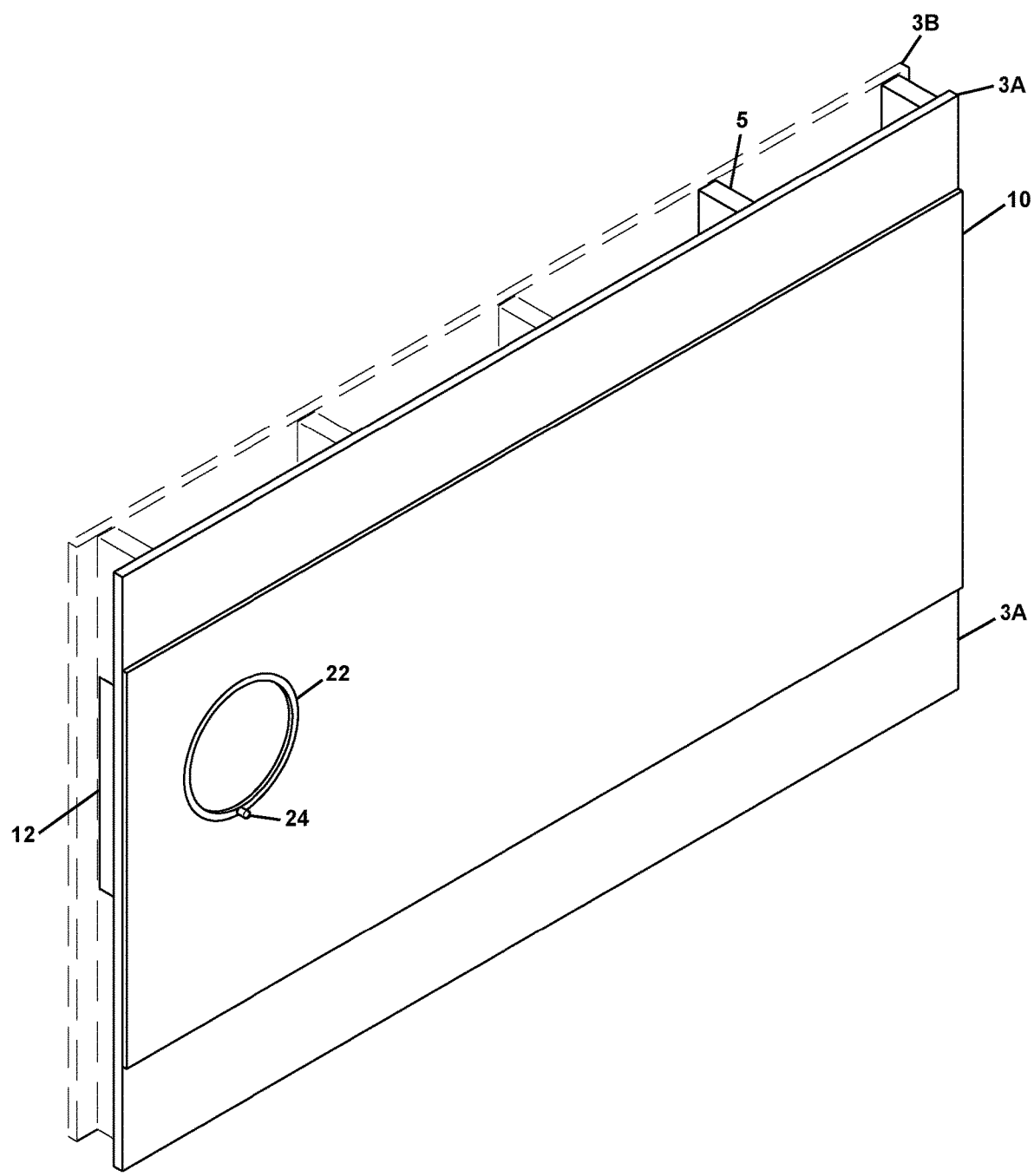
FIG. 4 is a perspective view of the mirror system of FIG. 3 post-installation.

FIG. 3 and FIG. 4 also show details of the wall installation of the vanity mirror system. A wall formed by wallboards 3A and 3B secured to a plurality of studs 5. 12 has a width selected to fit between studs 5 at a standard spacing, e.g., 16 inches on-center and therefore will generally have a width substantially equal to 14 inches. A 14 inch box provides ¼ inch of relief on either side of box 12, but any width between, for example, 13.5 inches and 14.5 inches could be selected. Narrower boxes could be used, but are more difficult to secure to studs 5, which can provide additional support to box 12 and extension arm 30. To install the vanity mirror system, a rectangular hole 7 is cut through wallboard 3A with an outline slightly larger than the outer dimensions of box 12, permitting box 12 to slide through rectangular hole 7 as the vanity mirror is located on the wall and then is secured to wallboard 3A and studs 5 via mirror clip mounts or other suitable attachment.

Figure 5A:
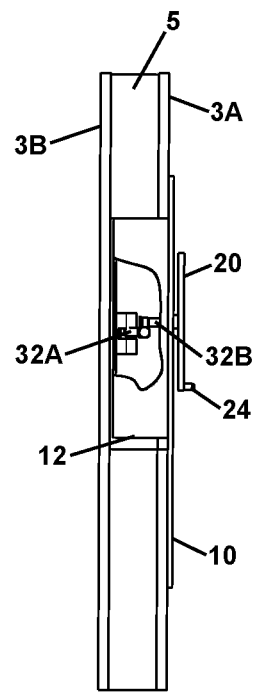
FIGS. 5A-5B are side views of the mirror system of FIGS. 3-4 in a stowed and an extended configuration, respectively.
Figure 5B:
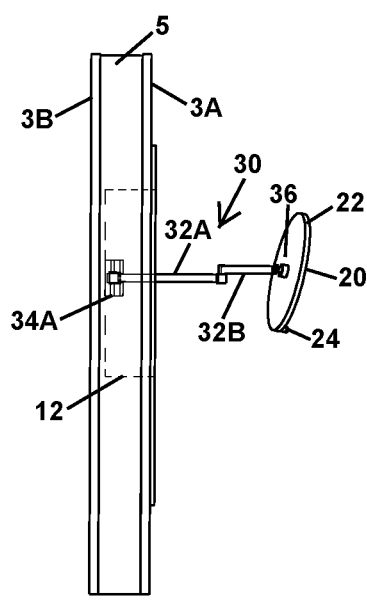
Figure 5C:
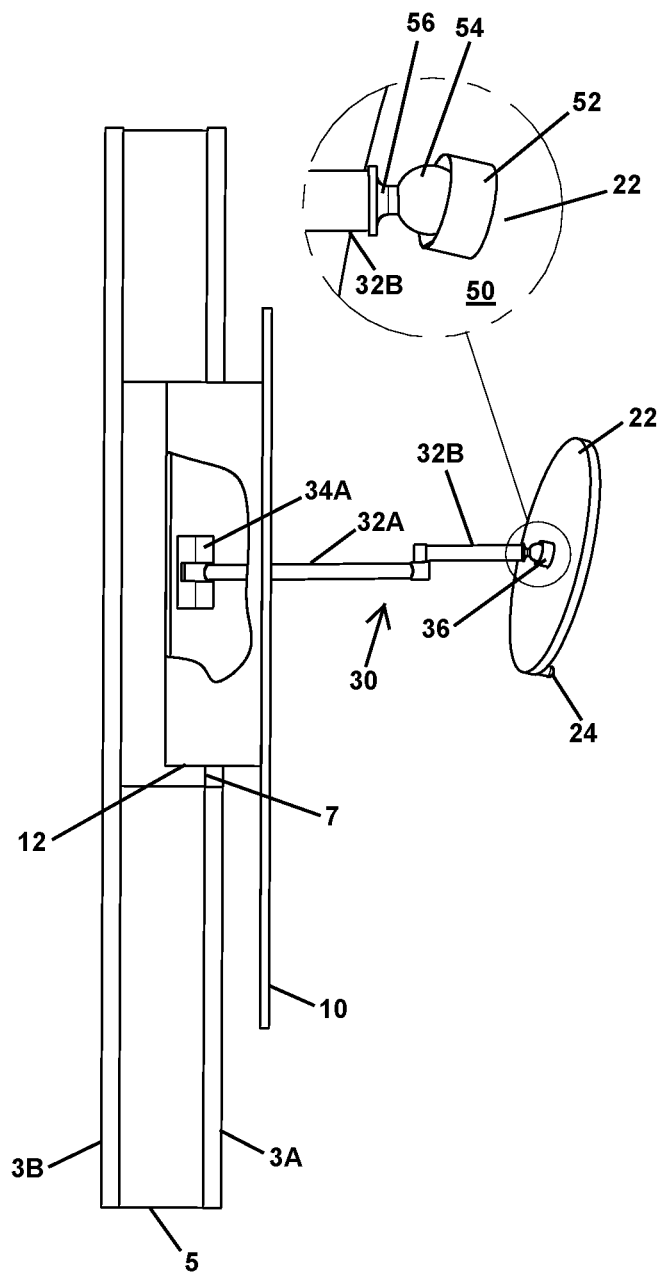
FIG. 5C is a side cross-section view of the mirror system of FIGS. 3-4 during installation.

Referring now to FIGS. 5A-5C, details of the mirror system of FIGS. 3-4 are shown. FIG. 5A shows magnifying mirror 20 in an almost completely retracted position, with arm segment 32A positioned substantially parallel to the plane of wall-mountable non-magnifying mirror 10 and arm segment 32B extending from arm segment 32A at an acute angle to connect to magnifying mirror 20. FIG. 5B shows magnifying mirror 20 in a fully extended position and tilted by a swivel 36 that connects arm segment 32B to mirror mount 22. Arm segments 32A and 32B are configured in an in-line or near in-line arrangement in the extended position of magnifying mirror 20. FIG. 5C illustrates details of the mirror system of FIGS. 5A-5B, in particular, details of swivel 36 shown in callout 50, in which a ball end 54 is connected to arm segment 32B by a stud portion 56. Ball end 54 is captured in a socket 52 attached to the back of mirror mount 22, permitting swivel 36 to rotate magnifying mirror 20 laterally and in an upward/downward direction. FIG. 5C illustrates the mirror system partially displaced from the wall formed by wallboards 3A, 3B and studs 5, showing clearance between box 12 and rectangular hole 7 cut in wallboard 3A for mounting the mirror system.

Figure 6:
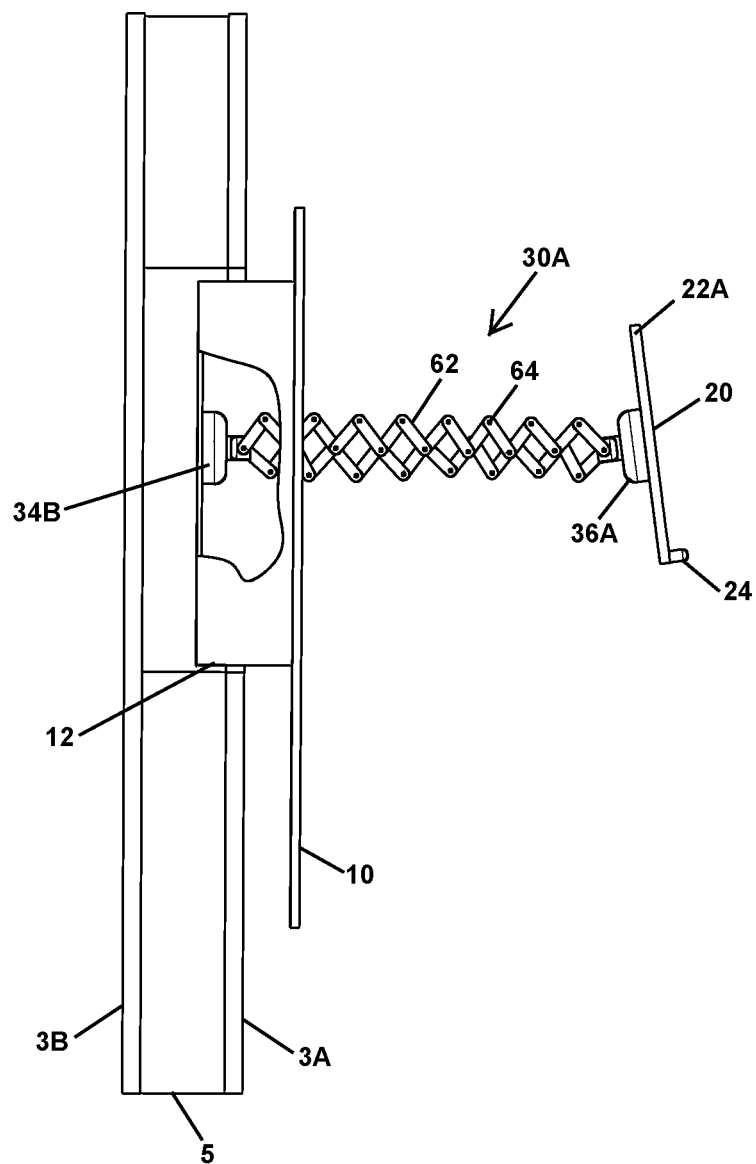
FIG. 6 is a side cross-section view of another example mirror system during installation.

Referring now to FIG. 6, another example mirror system is shown. The example mirror system of FIG. 6 is similar to the mirror system of FIGS. 3-4 and FIGS. 5A-5C, therefore only differences between them will be described below. The mirror system of FIG. 6 includes an extension arm 30A that is formed from a plurality of plates 62 interconnected by fasteners 64, such as rivets. Plates 62 rotate from a more vertical to more horizontal orientation to extend extension arm 30A and vice-versa, so that plates 62 contact adjacent corresponding plates, i.e., the plates that remain parallel to each other, when extension arm 30A is retracted into box 12. A hinged mount 36A is provided at the back side of a mirror mount 22A and connects to the last pair of plates 62. The first pair of plates 62 connect to a box mount 34B that secures extension arm 30A to the back side of box 12.

Figure 7:
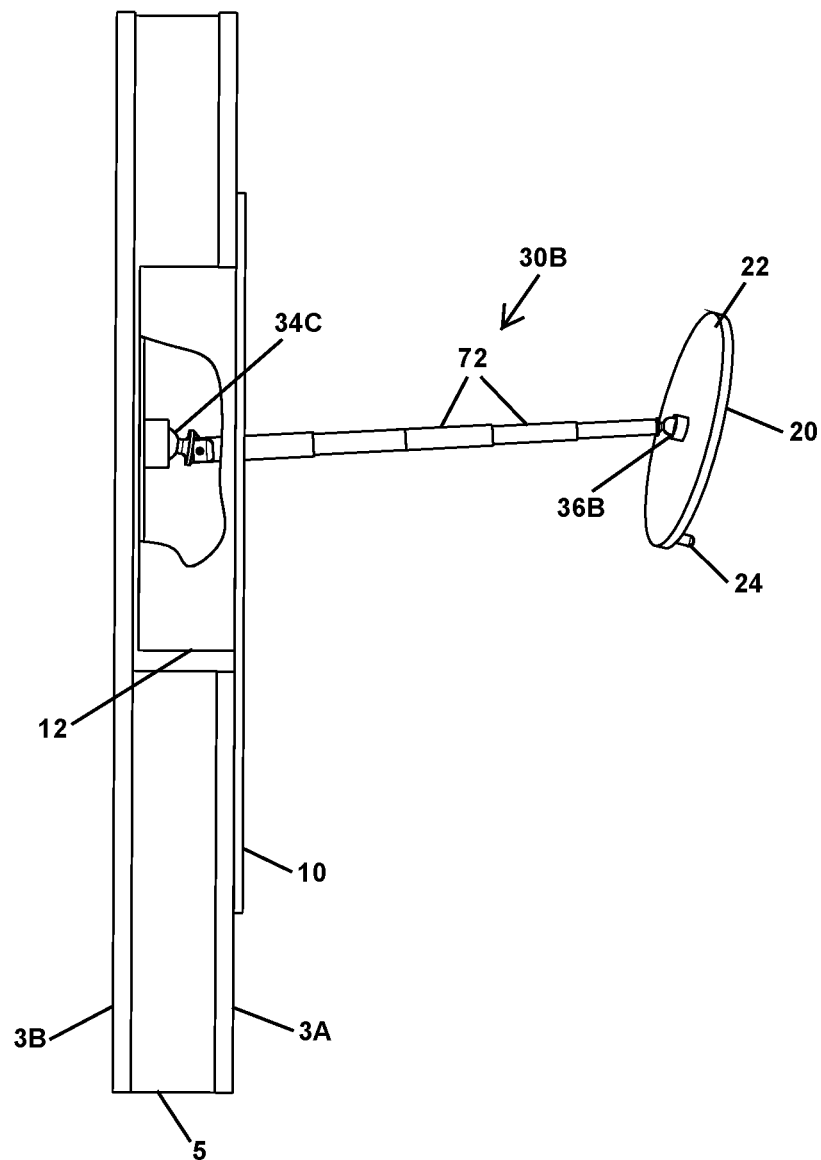
FIG. 7 is a side cross-section view of yet another example mirror system after installation.

Referring now to FIG. 7, yet another example mirror system is shown. The example mirror system of FIG. 7 is similar to the mirror system of FIGS. 3-4 and FIGS. 5A-5C, therefore only differences between them will be described below. The mirror system of FIG. 7 includes an extension arm 30B that is formed from a plurality of cylindrical segments 72 that are slideably coupled and of decreasing diameter in a direction away from box 12 so that a telescoping arm is formed. A swivel mount 36B is provided at the back side of mirror mount 22 and connects to the last of the telescoping cylindrical segments 72. The first of the telescoping cylindrical segments 72 connects to a swiveled box mount 34C that secures extension arm 30B to the back side of box 12.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A vanity mirror system, comprising:
   a wall-mountable non-magnifying mirror having an aperture passing therethrough from a back face to a front face thereof;
   a magnifying mirror having a shape fitted to a shape of a perimeter of the aperture of the wall-mountable non-magnifying mirror, so that in a first configuration, the magnifying mirror covers the aperture and has a front face substantially conforming to the front face of the wall-mountable non-magnifying mirror to provide an appearance of a substantially contiguous mirror system that includes a magnifying region in front of the magnifying mirror;
   a box having sides attached to the back face of the wall-mountable non-magnifying mirror and an open front conforming to the back face of the wall-mountable non-magnifying mirror, wherein the box is configured for mounting within a wall behind the wall-mountable non-magnifying mirror; and an extendable arm coupled to a back face of the magnifying mirror at a first end thereof and attached to an inner surface of the box, wherein in the first configuration, the extendable arm is recessed in the box so that the front face of the magnifying mirror substantially conforms to the front face of the wall-mountable non-magnifying mirror and the extendable arm is contained within the box, and wherein in a second extended configuration, the extendable arm is extended through the aperture and in front of the front face of the wall-mountable non-magnifying mirror to move the magnifying mirror in front of and out from the front face of the wall-mountable non magnifying mirror to permit a user to extend the magnifying mirror closer to the user's face.

2. The vanity mirror system of claim 1, further comprising a knob disposed at a perimeter of the magnifying mirror and attached thereto for facilitating extension of the magnifying mirror from the aperture.

3. The vanity mirror system of claim 2, wherein the aperture and the perimeter of the magnifying mirror are circular.

4. The vanity mirror system of claim 2, further comprising a mirror mount protector disposed around the perimeter of the magnifying mirror and covering a back side of the magnifying mirror.

5. The vanity mirror system of claim 1, further comprising a swivel mounted to the back face of the magnifying mirror and to which the extendable arm is attached, whereby the user can tilt the magnifying mirror with respect to the wall-mountable non-magnifying mirror.

6. The vanity mirror system of claim 1, wherein the box has a top side, a bottom side and two lateral sides, and wherein the two lateral sides are displaced from each other at a distance of between 13.5 and 14.5 inches to permit the box to lie between and mount to wall studs having a standard spacing of 16 inches.

7. The vanity mirror system of claim 1, wherein the extendable arm is a swing arm comprising multiple sections connected by hinges, wherein when the extendable arm is retracted within the box, the multiple sections collapse to position at least one of the multiple sections in an alignment substantially parallel to the plane of the wall-mountable non-magnifying mirror to fit within a depth of the box.

8. The vanity mirror system of claim 7, wherein the multiple sections of the swing arm comprise a first section having a first end thereof connected to an inside rear surface of the box by a first one of the hinges and second section having a first end connected to a second end of the first section by a second one of the hinges, wherein the second end of the second section is connected to the back face of the magnifying mirror by a swivel having a ball connected to the second end of the second section and a socket disposed on the back face of the magnifying mirror and attached to the ball.

9. The vanity mirror system of claim 1, wherein the extendable arm is a telescoping arm comprising multiple sections, wherein a first one of the multiple sections extends into a second one of the multiple sections, wherein when the extendable arm is retracted within the box, the first section collapses into the second section to reduce a length of the telescoping arm to fit within a depth of the box.

10. The vanity mirror system of claim 9, wherein the extendable arm is a telescoping arm comprising multiple sections, wherein a first end of the telescoping arm is connected to the back face of the magnifying mirror by a first swivel having a first ball connected to a first end of the telescoping arm and a first socket disposed on the back face of the magnifying mirror and attached to the first ball, and wherein a second end of the telescoping arm is connected to an inside rear surface of the box by a second swivel having a second ball connected to the second end of the telescoping arm and a second socket disposed on inner rear surface of the box and attached to the second ball.

11. The vanity mirror system of claim 1, wherein the extendable arm is formed from interconnected plates hinged together to form a scissor extension, wherein when the extendable arm is retracted within the box, the interconnected plates rotate to align in a parallel direction to reduce a depth of the extendable arm to fit within a depth of the box.

12. The vanity mirror system of claim 1, further comprising a knob attached to a front face of the mirror mount for facilitating extension of the magnifying mirror from the aperture.

13. A method of providing a magnifying mirror within a vanity mirror system, the method comprising:

mounting an assembly including a non-magnifying mirror to a wall, the non-magnifying mirror having an aperture passing, therethrough from a back face to a front face thereof and a box configured for mounting within the wall attached to a rear face thereof, wherein the box has sides attached to the back face of the non-magnifying mirror and an open front conforming to the back face of the non-magnifying mirror;

providing a magnifying mirror having a shape fitted to a shape of a perimeter of the aperture of the non-magnifying mirror;

in a first configuration, covering the aperture with the magnifying, mirror, wherein the magnifying mirror has a front face substantially conforming to the front face of the non-magnifying mirror to provide an appearance of a substantially contiguous mirror system that includes a magnifying region in front of the magnifying mirror;

extending the magnifying mirror to move the magnifying mirror in front of and out from the front face of the non-magnifying mirror using an extendable arm coupled to the back face of the non-magnifying mirror and to the box, so that the extendable arm extends through the aperture to extend in front of the non-magnifying mirror; and retracting the extendable arm within the box so that the extendable arm is recessed within the box and so that the front face of the magnifying mirror substantially conforms to the front face of the non-magnifying mirror.

14. The method of claim 13, further comprising:
coupling a back of the magnifying mirror to an extendable arm with a swivel; and
tilting the magnifying mirror with respect to the non-magnifying mirror by rotating the swivel.

15. The vanity mirror system of claim 14, wherein a first end of the extendable arm is connected to an inner rear surface of the box by a box mount, and wherein the second end of the extendable arm is connected to the back face of the magnifying mirror by a hinged mount.

16. The method of claim 13, wherein the extending is performed by grasping a knob attached to the magnifying mirror at a perimeter thereof.

17. A vanity mirror system, comprising:
- a wall-mountable non-magnifying mirror having a circular aperture passing therethrough from a back face to a front face thereof;
- a magnifying mirror having a circular shape fitted to the aperture of the wall-mountable non-magnifying mirror, so that in a first configuration, the magnifying mirror covers the aperture and has a front face substantially conforming to the front face of the wall-mountable non-magnifying mirror to provide an appearance of a substantially contiguous mirror system that includes a magnifying region in front of the magnifying mirror;
- a box having sides attached to the back face of the wall-mountable non-magnifying mirror and an open front conforming to the back face of the wall-mountable non-magnifying mirror, wherein the box is configured for mounting within a wall behind the wall-mountable magnifying mirror;
- an extendable arm coupled to a back face of the magnifying mirror at a first end thereof and attached to a back of the box, wherein in the first configuration, the extendable arm is recessed in the box so that the front face of the magnifying mirror substantially conforms to the front face of the wall-mountable non-magnifying mirror and the extendable arm is contained within the box, and wherein in a second extended configuration, the extendable arm is extended through the aperture and in front of the front face of the wall-mountable magnifying mirror to move the magnifying mirror in front of and out from the front face of the wall-mountable non-magnifying mirror to permit a user to extend the magnifying mirror closer to the user's face;
- a swivel mounted to the back face of the magnifying mirror and to which the extendable arm is attached, whereby the user can tilt the magnifying mirror with respect to the wall-mountable non-magnifying mirror;
- a mirror mount disposed around a perimeter of the magnifying mirror and covering a back side thereof; and
- a knob attached to a front face of the mirror mount at an edge of the magnifying mirror to provide a handle for moving the magnifying mirror out of or toward the aperture.

18. The vanity mirror system of claim 17, wherein the box has a top side, a bottom side and two lateral sides, and wherein the two lateral sides are displaced from each other at a distance of between 13.5 and 14.5 inches to permit the box to lie between and mount to wall studs having a standard spacing of 16 inches.

* * * * *